United States Patent Office 3,523,765
Patented Aug. 11, 1970

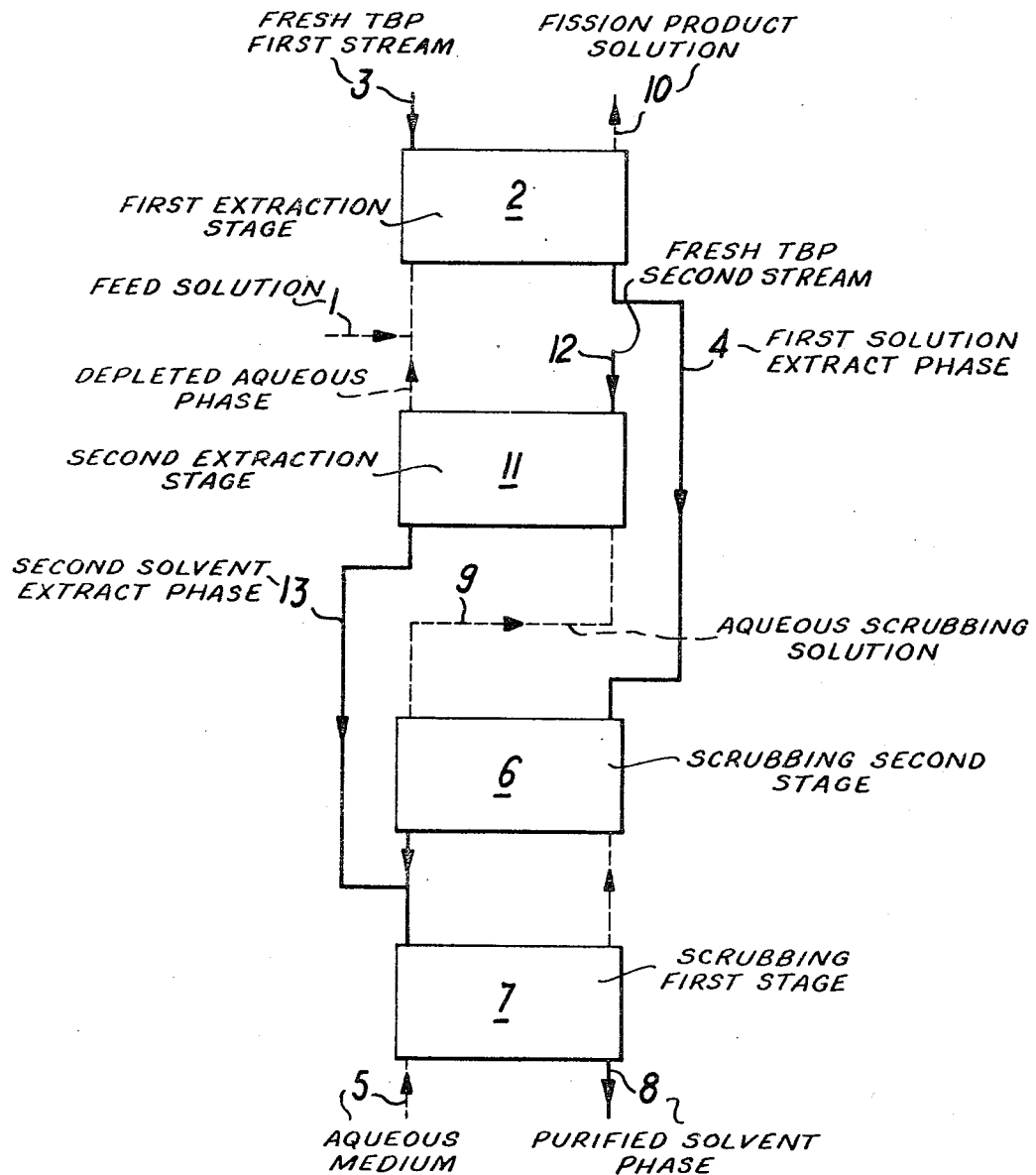

3,523,765
MULTISTAGE PROCESS FOR EXTRACTING
U AND Pu WITH SOLVENT COMPRISING
TRIBUTYLPHOSPHATE
André Grieneisen, Paris, France, assignor to Commissariat a l'Energie Atomique, Paris, France
Filed Feb. 27, 1967, Ser. No. 618,621
Claims priority, application France, Mar. 8, 1966,
52,601
Int. Cl. B01d 11/04
U.S. Cl. 23—341                                    4 Claims

ABSTRACT OF THE DISCLOSURE

The invention relates to a process for the extraction of uranium and plutonium ions from an aqueous solution, derived from the reprocessing of irradiated nuclear fuels, and comprises successively a primary stage wherein said ions are extracted into a first organic solvent containing tributylphosphate, followed by washing the loaded solvent thus obtained with an aqueous washing solution. In a secondary stage said ions, which are carried over with said aqueous washing solution, are extracted into a second organic solvent stream prior to recycling.

---

This invention relates to a liquid-liquid extraction process and is more specifically concerned with the extraction of chemical constituents of an aqueous solution into an organic solvent, or conversely. The invention applies mainly to the exrtaction of uranium and plutonium contained in aqueous solutions derived from the processing of irradiated nuclear fuels.

As is already known, the essential aim of the solvent extraction process involved in fuel reprocessing is to remove the fission products contained in the aqueous fuel solution whilst the uranium and plutonium which are also present therein are extracted into an organic solvent, usually a solvent having a base of TBP (tributyl phosphate).

In order to achieve the desired purification, extraction conditions must be determined with precision in order to obtain a favorable separation factor, in which acid concentration in particular plays a decisive role. Moreover, in order to obtain a uranium and plutonium extract which is as free of fission products as possible, the extraction process proper is usually followed by washing of the organic phase which is loaded with an aqueous acid solution, the contaminated aqueous solution obtained being recycled to the feed end of the extraction stage together with the aqueous solution to be processed.

In practice, this process presents difficulties when it is found necessary to obtain both a high extraction yield and maximum removal of impurities, namely of fission products in the case under consideration.

In point of fact, the degree of purification can be increased only by increasing the relative wash flow, thereby increasing at the same time the rate at which the elements to be extracted are returned to the stripping section. It is consequently necessary either to regulate the solvent flow rate with great care in order to extract not only the feed elements but also those which are recycled in the washing stage or to adopt a solvent flow rate which is distinctly in excess.

In the first case, any maladjustment resulting from a deficiency of the solvent flow or from excess flow of the aqueous solution containing extractable elements or so-called rich solution can give rise to accidental release of said elements which are carried over with the effluent aqueous phase. In the second case, the proportion of extraneous impurities which are extracted into the solvent is correspondingly higher as the excess solvent employed is greater since a larger quantity of impurities is extracted by insufficiently saturated solvent.

When it is desired to effect the quantitative extraction of uranium and plutonium, the above-noted difficulties of adjustment are further complicated by a phenomenon of selective reflux of plutonium arising from the fact that plutonium is less readily extractable than uranium. The aqueous washing solution effects the partial stripping of the plutonium inasmuch as this latter is less readily extractable into the organic solvent, which the result that an accumulation of plutonium is liable to take place at the point at which the rich solution is fed to the extraction stage. By reason of the fissionable nature of plutonium, a sufficient concentration of this material may give rise to a criticality hazard or in some instances to excessive saturation of the organic solvent and a risk of separation of its constituents.

The aim of this invention is to reduce the risk of accumulation of plutonium while permitting of sufficient washing to obtain optimum purification of the plutonium.

The invention accordingly proposes a process for the extraction of an element contained in an aqueous solution to be processed, wherein said process comprises successively a primary stage of extraction of said element into a first organic solvent stream followed by washing of the loaded solvent thus obtained with an aqueous washing solution, a secondary stage of extraction of said element which is carried over with said aqueous washing solution and extracted into a second organic solvent stream followed by recycling of said aqueous washing solution to the primary extraction stage together with the aqueous solution to be processed.

According to a preferred mode of execution of said process, the washing of the first stream of loaded organic solvent is carried out in two successive steps by the aqueous washing solution which is circulated in countercurrent flow and the second stream of loaded organic solvent which is derived from the secondary extraction stage is mixed with the first stream between the two successive washing stages.

Furthermore, by transposing the terms "aqueous solution" and "organic solvent," the process under consideration can readily be adapted to the extraction of the element initially contained in an organic solvent.

Reference being made to the single accompanying figure, there now follows a description of a particular mode of execution of the process according to the invention. This description relates to the extraction of uranium and plutonium, but is given solely by way of example and is not intended to imply any limitation of the invention.

The process described hereinafter is illustrated diagrammatically in the accompanying figure. The circulation of organic solvent between the different stages of the process is indicated by a full line whilst the circulation of the aqueous solutions is shown in broken lines.

Each extraction or washing step is performed in the conventional manner by countercurrent circulation of the aqueous phase and organic phase in a bank of mixer-settlers.

The organic solvent employed is a solution of TBP in dodecane.

The rich solution to be processed is an aqueous feed solution which essentially contains plutonium, uranium and fission products or other impurities in a nitric acid medium. This rich solution is fed at 1 into the extraction stage 2 or so-called primary or first extraction stage. The solution is contacted therein with the first organic solvent stream which is introduced at 3 and circulated in countercurrent flow. The uranium and plutonium are preferentially extracted into the solvent while the fission products remain preferentially in the effluent aqueous phase or fission product solution which is discharged at 10.

The first organic solvent extract phase which passes out of the primary extraction stage at 4 is thus loaded with uranium and plutonium, but nevertheless contains a certain proportion of fission products. In order to remove these latter, the solvent is then washed with an aqueous medium nitric acid solution which is introduced at 5. This washing process is performed in two stages comprising successively a so-called second washing or scrubbing stage 6 and a so-called first washing or scrubbing stage 7. There is finally obtained at 8 a purified solvent phase or plutonium and uranium loaded solvent which is freed of fission products.

In accordance with the invention, the contaminated aqueous or scrubbing solution which is discharged from the secondary washing stage at 9 passes through a so-called secondary extraction stage 11 prior to recycling to the first extraction stage 2. Said second extraction 11 is carried out by a second or fresh organic solvent stream which is admitted at 12. By virtue of this secondary extraction, the less readily extractable components are prevented from returning to the first extraction stage. The second solvent extract which leaves the secondary extraction stage at 13 is then sent to the first washing or scrubbing stage 7 together with the first solvent extract phase with which it is mixed and which is derived from the second washing or scrubbing stage 6.

One of the main advantages of this process lies in the fact that the adaptation of the rate of flow of solvent to the rate of flow of rich solution is independent of the characteristics of the wash and that slight variations in the flow of rich solution can be tolerated without thereby affecting the quality of the end product to any significant extent. The flow rate of the first solvent stream which is admitted at 3 is calculated in practice solely as a function of the quantity of extractable elements contained in the rich feed solution which is introduced at 1 without taking into account the quantity which is recycled in the washing or scrubbing stage, this quantity being of a very low order.

There now follows a description of two examples of application of the process (the flow rates being expressed in cubic centimeters per hour).

EXAMPLE I (A) In accordance with the process contemplated by the invention, 100 cm.$^3$ of a solution having the following composition: U=150 g./l., Pu=350 mg./l., Mo=750 mg./l., and HNO$_3$=3 N were fed at 1 to stage 8 of a bank of mixer-settlers according to the single figure of the accompanying drawings and comprising 18 stages. 128 cm.$^3$ of an organic phase consisting of 30 volume percent TBP in dodecane were fed to stage 1 at 3. The organic phase loaded with uranium and plutonium was then fed at 4 directly to stage 12 of the mixer-settler bank. This organic phase was then subjected to a washing operation from stage 12 to stage 18 of the mixer-settler bank. Washing was carried out by 27 cm.$^3$ of a 3 N nitric acid solution (aqueous medium) which was fed to stage 18 at 5. At the same time, 27 cm.$^3$ of an organic phase consisting of 30 volume percent TBP in dodecane was fed in at 12 (second solvent stream) to stage 9 of the mixer-settler bank, thereby stripping the major part of the extractable elements contained in the aqueous washing or scrubbing solution which was returned from stage 12. This second solvent stream then passed from stage 11 to stage 14 of the mixer-settler bank in which it was mixed with the 128 cm.$^3$ of the solvent derived from the first extraction stage and from the second washing stage, and the aggregate was subjected to a final washing process between stages 14 and 18 of the bank. Thereupon, the loaded organic or purified solvent phase passed out of the mixer-settler bank at 8 while the effluent aqueous phase or fission product solution passed out at 10. Under these conditions, namely in respect of a ratio of the flow rate of the washing solution to the flow rate of solvent which was equal to 0.17, the concentration of plutonium in the depleted aqueous phase leaving second extraction stage 11 which was returned to the first extraction stage, that is to say which left stage 9 of the mixer-settler bank, was equal to 0.3 mg./l.

(B) By way of comparison, a countercurrent extraction was performed on a solution having the same composition under the following conventional conditions:

100 cm.$^3$ of aqueous solution containing uranium and plutonium were fed to stage 8 of a bank of mixer-settlers comprising 15 stages. The uranium and plutonium were extracted into 144 cm.$^3$ of solvent (30 volume percent TBP in dodecane) admitted at stage 1 of the bank. The loaded organic solvent was then washed with 14 cm.$^3$ of a 3N nitric acid solution between stages 9 and 15 of said mixer-settler bank.

Under these conditions, that is to say in respect of a ratio of the wash flow to the solvent flow which was equal to 0.097, the plutonium concentration of the aqueous phase which passed to the extraction stage from stage 9 was equal to 321 mg./l.

It is therefore noted that, in the conventional process and in spite of a relatively less abundant washing than in the process according to the invention, the quantity of fissionable material which is recycled to the extraction stage is considerably greater.

EXAMPLE II (A) In accordance with the process contemplated by the invention, 100 cm.$^3$ of a stripping solution derived from the first cycle and subjected to concentration by evaporation at normal pressure were fed at 1 to stage 8' of a bank of mixer-settlers according to the single figure of the accompanying drawings and comprising 16 stages. The composition of this solution was as follows: U=300 g./l., Pu=700 mg./l. (30% of which was hexavalent plutonium, therefore less readily extractable than tetravalent plutonium) and HNO$_3$=1.7 N. The elements (U and Pu) were extracted into 281 cm.$^3$ of a first stream of an organic phase constituted by 30 volume percent TBP in dodecane and were fed at 3 to stage 1' of the mixer-settler bank. The uranium and plutonium loaded organic or first solvent extract phase was then introduced at 4 into stage 12' of said bank. Washing of the organic or first solvent extraction phase was then carried out from stage 12' to stage 16' with a 1.7 N nitric acid solution (aqueous medium) introduced at 5. At the same time, there were fed at 12 into stage 9' of the mixer-settler bank 12.33 cm.$^3$ of the second stream solvent (30 volume percent TBP in dodecane) which stripped the major proportion of extractable elements contained in the aqueous washing stage returned from stage 12'. This second solvent stream then passed from stage 11' to stage 14' in which it was mixed with the 281 cm.$^3$ of solvent derived from the first extraction stage and from the second washing stage, whereupon the aggregate was subjected to final washing between stages 14' and 16'. After washing, the loaded organic or purified solvent phase left the bank of mixer-settlers at 8 while the effluent aqueous phase or fission product solution left this latter at 10. Under these conditions, that is to say in respect of a ratio of wash flow to solvent flow which was equal to 0.105, the plutonium concentration in the depleted aqueous phase which was fed back to the first extraction stage after washing of the organic phase, that is to say after leaving stage 9' of the mixer-settler bank, was equal to 9 mg./l.

(B) By way of comparison, a countercurrent extraction was performed on a solution having the same composition but under conventional conditions. In a bank of mixer-settlers comprising 16 stages, 100 cm.$^3$ of aqueous solution containing uranium and plutonium were fed to stage 8 of said bank. The uranium and plutonium were extracted into 287 cm.$^3$ of solvent (30 volume percent TBP in dodecane) as introduced in stage 1 of the mixer-settler bank. The loaded solvent was then washed with 29 cm.³ of a 1.7 N nitric acid solution between stage 9 and stage 16 of said mixer-settler bank.

Under these conditions, that is to say in respect of a ratio of wash flow to solvent flow equal to 0.101, the plutonium concentration of the aqueous washing phase which was returned to the extraction stage, that is to say which left stage 9, was equal to 1,170 mg./l. It is therefore observed that, in the case of a relative wash flow of the same order, the proportion of fissionable material recycled to the extraction stage is very much higher in the conventional process.

What I claim is:

1. A process for separating uranium and plutonium from an aqueous feed solution comprising the steps of contacting said feed solution in a first extraction stage with a first stream of an organic solvent containing tributylphosphate, whereby the uranium and plutonium preferentially enters the solvent phase while the fission products predominantly remain in the aqueous phase, separating a first solvent extract phase from a fission product solution, then scrubbing said first solvent extract phase by contacting it with an aqueous medium and separating an aqueous scrubbing solution containing fission products from a purified solvent phase containing uranium and plutonium, then contacting, in a second extraction stage, said scrubbing aqueous solution containing fission products with a second stream of said organic solvent and separating a second solvent extract phase from a depleted aqueous phase, then recycling said depleted aqueous phase with said feed solution to said first extraction stage, and then scrubbing said second solvent extract phase together with said first solvent extract phase.

2. A process according to claim 1, the solvent being tributyl phosphate in solution in dodecane.

3. A process according to claim 2, wherein the aqueous scrubbing solution is constituted by a solution of strong nitric acid.

4. A process for separating uranium and plutonium from an aqueous feed solution comprising the steps of contacting said feed solution in a first extraction stage with a first stream of an organic solvent containing tributylphosphate, whereby the uranium and plutonium preferentially enters the solvent phase while the fission product predominantly remain in the aqueous phase, then separating a first solvent extract phase from a fission product solution, then scrubbing said first solvent extract phase by contacting it with an aqueous medium and separating an aqueous scrubbing solution containing fission products from a purified solvent phase containing uranium and plutonium, then contracting, in a second extraction stage, said scrubbing aqueous solution containing fission products with a second stream of said organic solvent and separating a second solvent extract phase from a depleted aqueous phase, then recycling said depleted aqueous phase with said feed solution to said first extraction stage, and then mixing said second solvent extract phase with said first solvent extract phase between a first and a second scrubbing stage to contact it with said aqueous medium in said first scrubbing stage.

References Cited

UNITED STATES PATENTS 2,848,300  8/1958  Warf _____ 23—341

FOREIGN PATENTS 791,059  2/1958  Great Britain.
968,037  8/1964  Great Britain.

LELAND A. SEBASTIAN, Primary Examiner

U.S. Cl. X.R.

23—339